C. P. THOMAS.
FREEZER.
APPLICATION FILED MAY 4, 1914.

1,170,786.

Patented Feb. 8, 1916.
2 SHEETS—SHEET 1.

Witnesses:
Clarence Perdew
Irene Parker

Inventor
Charles P. Thomas
By James N. Ramsey
Attorney.

C. P. THOMAS.
FREEZER.
APPLICATION FILED MAY 4, 1914.
1,170,786.
Patented Feb. 8, 1916.
2 SHEETS—SHEET 2.
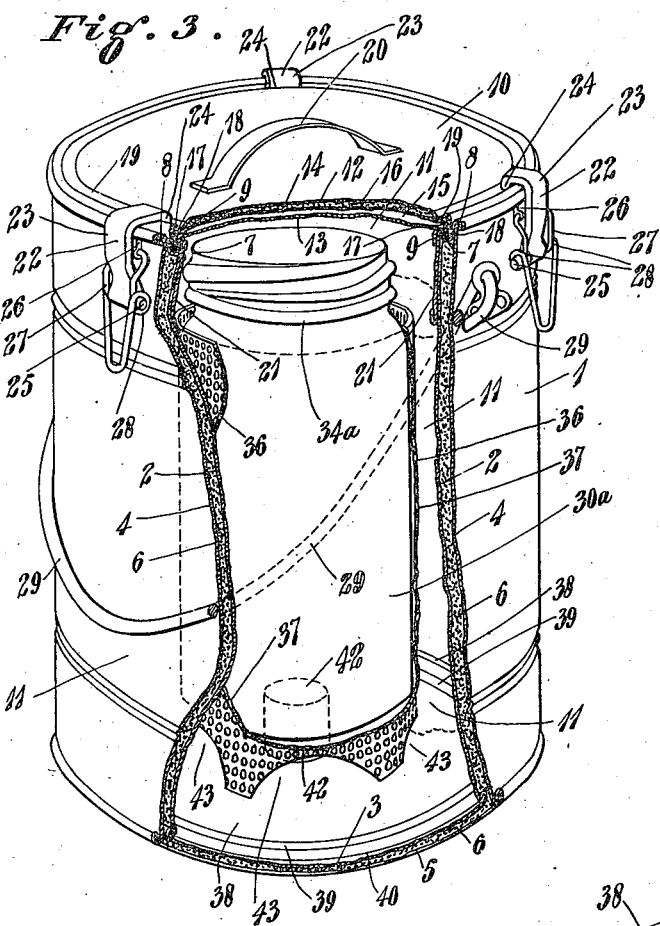
Witnesses:
Clarence Perdew
Irene Parker
Inventor
Charles P. Thomas
By James N. Ramsey
Attorney

UNITED STATES PATENT OFFICE.

CHARLES P. THOMAS, OF LUDLOW, KENTUCKY.

FREEZER.

1,170,786.      Specification of Letters Patent.      Patented Feb. 8, 1916.

Application filed May 4, 1914. Serial No. 836,061.

*To all whom it may concern:*

Be it known that I, CHARLES P. THOMAS, a citizen of the United States, and a resident of Ludlow, in the county of Kenton and State of Kentucky, have invented certain new and useful Improvements in Freezers, of which the following is a specification.

My invention relates to heat-insulated receptacles and to ice cream freezers; and its object is to provide a simple device of this character that will be effective in its operation and manipulated with facility in carrying out the different steps of the operation, and, especially with relation to freezing ice cream and similar products, to freeze small quantities in comparatively little time and with comparatively little labor.

My invention consists in the parts and in the details of construction and arrangement of parts as will hereinafter be more fully described and claimed.

Figure 1:
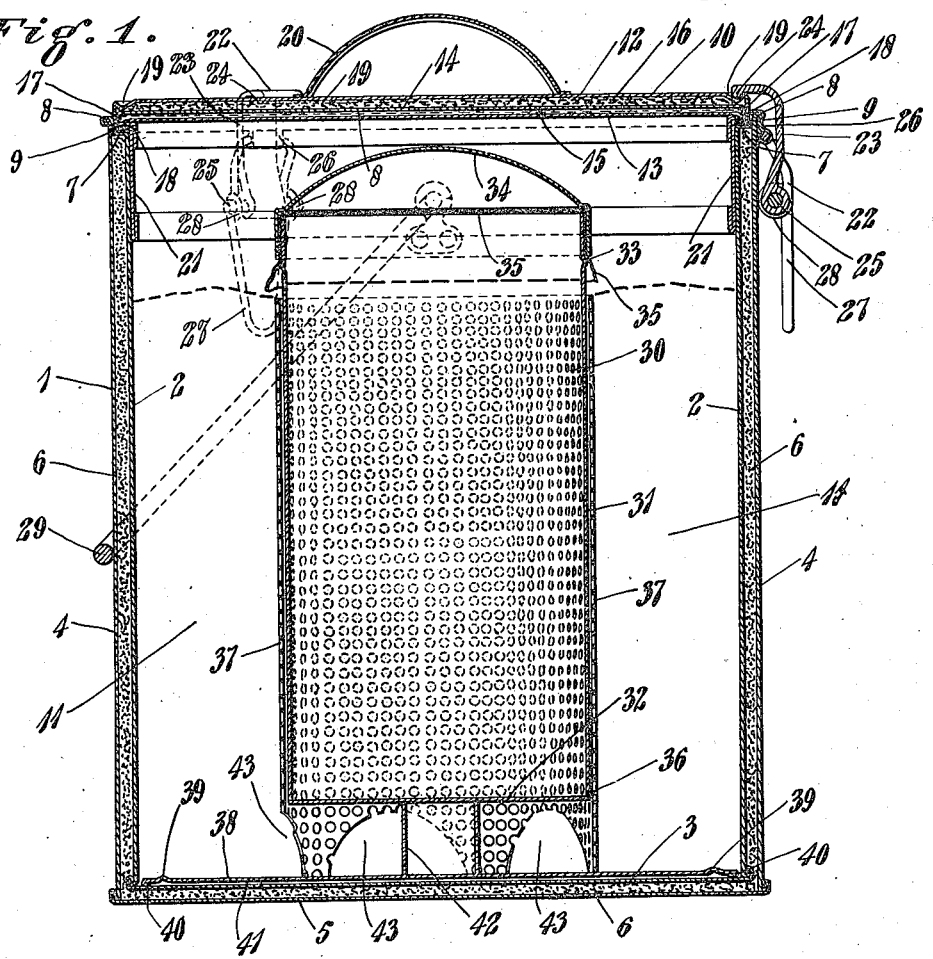
Figure 2:
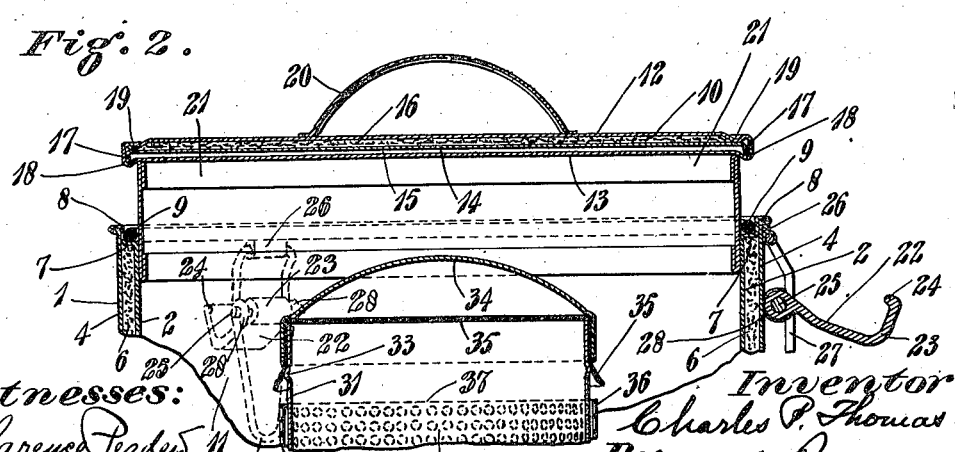

In the drawings: Figure 1 is a vertical cross section of a device embodying my invention, with all the parts in closed position as they are during the freezing operation; Fig. 2 is a partial view similar to Fig. 1, showing how the gasket and cover are applied to the device; Fig. 3 is a sectional perspective view showing the device with an ordinary glass jar used to contain the substance being frozen; Fig. 4 is a detail perspective view of the curb; and Fig. 5 is a detail perspective view of the removable flange for the gasket.

The outside or heat-insulated vessel 1 comprises the inner cylindrical wall 2 with the flat bottom 3 and the outer cylindrical wall 4 with the flat bottom 5, leaving a space all around and under between these walls which is preferably filled with a good insulating material such as felt 6. At the upper rim of the vessel the inner wall 2 is flanged out across the space between the inner and outer walls and then upward and seamed over the upper edge of the outer wall, so as to form the ledge 7 all around inside the rim of the vessel, and thereby completely closing the space between the walls, and with the upstanding rim 8 of the outer wall, formed by the seaming of the inner wall over the outer wall, forming the outer limit of this ledge 7. Upon the ledge 7 is placed a gasket ring 9, which may be of rubber and of circular cross section as shown, and the lid 10 is adapted to be clamped down on this gasket, thus to hermetically seal the interior 11 of this outer vessel 1.

The lid 10 is preferably made up of the outer or main plate 12 flanged downward and inward and joined to the inner plate 13 with an intermediate plate 14 between these two plates 12 and 13 and spaced apart from both of them to leave an air space 15 below the intermediate plate 14 and the inner plate 13, and leaving a space above the intermediate plate 14 between it and the main outer plate 12, which is preferably filled with insulating material such as felt 16, like the felt 6 inclosed in the hollow walls of the vessel 1. As shown, the intermediate plate 14 has a downwardly turned peripheral flange 17 and the inner plate 13 has a downwardly extending annular bead 18 around its periphery that receives the lower edge of this flange 17, so that the intermediate plate 14 is held in proper position with respect to the inner plate 13; and the main outer plate 12 has an annular groove or gutter 19 around just inside its periphery, the inner side of which bears down on the upper side of the intermediate plate 14 near the periphery thereof, holding the plate 14 with its flange 17 down in the interior of the bead 18. These parts of the lid 10, and also the parts of the vessel 1 previously described, are preferably made of heavy tin plate and soldered together, and the arrangement just described is especially adapted to provide a lid of strong construction when made of such material; although it will be understood that any other suitable construction may be employed, so long as the proper insulating and hermetical sealing functions are provided for. The lid 10 may have a handle 20 for conveniently lifting it on and off of the vessel.

The gasket 9, after the lid 10 is brought down upon it, will receive the lower side of the peripheral bead 18 of the lid and will then be held out in its proper position around the ledge 7; but in applying the lid and gasket, considerable difficulty is experienced in keeping the gasket in proper position on the ledge until the lid is firmly brought down thereon, unless some means is provided for keeping the gasket spread out upon the ledge. To provide the ledge 7 with a permanent interior wall, thus making a gutter of the ledge, will provide for this; but considerable care is then necessary in fitting the gasket down into such a gutter all around, especially since such interior wall must be low enough not to interfere with the firm bearing of the ledge 10 on the gasket; and also such a permanent gutter around the rim of the vessel will be difficult to keep clean. I provide for maintaining the gasket in position and avoid the above objectionable consequences by means of the removable flange 21 which is a short cylindrical shell or collar, made, as here shown, of sheet metal with its edge parts folded inward and having a smooth interior surface so that it is adapted to fit snugly inside the inner wall 2. With the use of this removable flange 21 for the gasket 9, it is first slipped into the top of the vessel 1, as shown in Fig. 2, leaving a considerable part of it extending above the top of the vessel, and then the gasket 9 is easily slipped down over this extended part and forced down upon the ledge 7 all around, after which the lid 10 is placed upon the flange 21, centering thereon by means of the bead 18 on the lower side of the lid, and pushed downward, pushing the flange down into the vessel 1 and stopping where its bead 18 fits upon the gasket 9, so that the flange 21 has effectively maintained the gasket 9 on the ledge 7 during this operation and has descended just as far as is necessary to allow the lid 10 to have its proper bearing on the gasket as shown in Figs. 1 and 3. The provision of this removable flange for the gasket also facilitates the removal of the gasket from the vessel, since the flange is easily pulled out and then leaves the gasket free to collapse inward from its position around on the ledge 7.

To hold the lid 10 tightly down upon its gasket 9, I provide, as here shown, three clamps 22 spaced equally around the rim of the vessel, each clamp comprising a hook 23 that has a downwardly projected bead 24 to engage in the groove or gutter 18 of the lid 10, and extends out over the rim and down the side of the vessel where it has a transverse pivot pin 25. Up close to the rim of the vessel is a small bracket 26, upon which is pivoted a bifurcated lever 27 flanking the hook 23 and having ears 28 receiving the pivot pin 25 at each side of the hook 27, this lever extending downward past this pivotal connection with the hook 23 some distance, and its free end being engaged by the fingers to manipulate the clamp. Thus, this lever 27 is swung out from the vessel and raises the hook 23 so that the hook may have its bead 24 engaged in the gutter 19. The hook is then held down in this position while the lever 27 is forced down toward the vessel, swinging the pivot 25 down around the bracket 26 until the parts adjacent to the pivot 25 engage with the outside of the vessel, whereupon, the parts being properly proportioned, the pivot 25 has passed a center line running through the point of engagement of the bead 24 with the lid and through the pivot of the lever 27 in the bracket 26, so that the clamp holds the lid tightly down. The clamp is easily released by pulling outward and upward on the free end of the lever 27 until the pivot 25 has passed the center line above referred to. Thus, the clamp operates by substantially vertical pressure as distinguished from any horizontal clamping movement, and there is no necessity for sliding the lid 10 around on the gasket 9 at any time during the operation of closing the vessel 1, so that I am enabled to secure a practically perfect hermetical sealing of the vessel 1 by the means above described. It will be understood that I may use any suitable clamp providing such sealing effect.

The vessel 1 is preferably provided with a bail 29 for handling it conveniently, or it may have any other well known means for facilitating the handling of it. Interiorly, the vessel is devoid of any permanent projections, so that it has simply the smooth concave interior walls and the smooth flat bottom, thus being very easily kept clean. On account of this, the structure so far described is not limited to use in a freezer, but is well adapted for use in any connection where a heat-insulating vessel may be needed to maintain either a low or a high temperature of the contents.

For use as a freezer however, and which is the most important use of my invention, I provide an inner vessel 30 with plain cylindrical walls 31 and a flat bottom 32 of single thickness. Around near its upper rim it preferably has an outwardly projected bead 33 to strengthen it, and a cupped lid 34 fits down over the rim. Before applying the cupped lid 34 however, a suitable gasket is applied over the rim of the vessel 30, such as the gasket 35 shown herein, which, as I have found in practice, may simply be a fairly closely woven textile fabric such as muslin, which is spread across the top of the vessel 30 and the lid 34 drawn over it, the lid and vessel being made of such relative proportions that the fabric is somewhat tightly clamped on the vessel by the lid. This vessel 30 is to contain the ice cream or other substance to be frozen, and the gasket 35 is provided merely to prevent the taste or odor of the freezing medium being imparted to the ice cream or other contents of the vessel 30.

According to the broad principle of operation of the device, the vessel 30 may simply be placed in the heat insulating vessel 1 and then a freezing medium, such as a mixture of ice and salt, packed around it and under it in the space 11 inside the vessel 1, whereupon the heat will be extracted from the contents of the vessel 30 into the freezing medium in the space 11. After two or three minutes in this condition, with the vessel 1 sealed, the substance in the vessel 31 will be frozen rather hard all around adjacent to the walls 31 and bottom 32 of the vessel 30 for a thickness of a quarter of an inch or more. If the outer vessel 1 now be opened and the inner vessel 30 removed and opened, the contents of this inner vessel 30 may be stirred thoroughly, mingling the frozen crust with the unfrozen liquid interior of the contents, so that the entire contents has its temperature considerably reduced, and being thus brought into a partially congealed condition. If the inner vessel 30 is again closed and again put into the heat insulating vessel 1 with the freezing medium packed around it in the space 11 and the vessel 1 again closed as described, and this condition allowed to continue for about twenty minutes more, then upon removal of the inner vessel 30, the ice cream or other contents thereof will be found to be congealed or frozen to the proper consistency for use, uniformly solid throughout. The frozen contents may be readily removed from the plain cylindrical inner vessel 30 by a very brief immersion of this vessel in hot water, very slightly melting the contents where it clings to the wall of the vessel 30, so that the contents will freely slide out as a solid cylinder, which may then be sliced into portions as desired, or the contents may be scooped from the vessel 30 and served in any other form. It will be understood that the inner vessel 30 may be about three or four inches in diameter; if it exceeds such dimensions, an excessive length of time will be required for the final freezing operation, and even then the freezing may not be uniform. By providing the improved hermetical sealing of the outer heat-insulating vessel 1, I have made a marked step in advance in the art of freezing without constant manipulation, by the provision of the structure as so far described. As before alluded to, however, after the first brief freezing operation, it is necessary to open the inner vessel and stir the contents, and it is impractical to do this without removing the inner vessel from the proximity of the freezing medium, such as ice and salt, in the space 11 in the outer vessel. The packing of this freezing medium around and under the inner vessel 30 at the beginning, and then the repeating of this operation for the final freezing, is highly inconvenient, causing not only loss of time, but loss of freezing effect of the freezing medium. To avoid these inconveniences and losses, I provide the curb 36, which comprises a perforated cylindrical shell 37 of interior diameter so that it will receive the inner vessel 30 snugly, and of sufficient thickness to resist the inward pressure of the freezing medium when it is tightly packed in the space 11. The top of this shell 37 is freely open to admit the inner vessel 30, but the bottom is attached preferably by soldering to a base 38, which is a circular plate adapted to fit loosely down in the vessel and lie upon the interior bottom 3 thereof, preferably having, out near its periphery, a bead 39 to strengthen it, and having its edge parts 40 turned downwardly and inwardly as shown, so that, preferably, the plate is slightly spaced upward from the plate 3 of the bottom of the vessel, leaving a slight air space 41 between this base 38 and the bottom plate 3 of the vessel, thereby adding to the insulation. Centrally, inside the shell 37, this base 38 has a pedestal 42 which, as shown, consists of a short tube with its lower end secured to the base 38, preferably by soldering, and with its upper end adapted to have the flat bottom 32 of the inner vessel 30 rest upon it. The shell 37 of the curb 36 has a series of cylindrical semi-circular openings 43 in its bottom, spaced therearound, preferably leaving only so much of the bottom of the shell 37 as gives a sufficiently strong connection to the base 38. Thus, free communication is afforded between the space 11 and the space under the inner vessel 30.

In practice, the curb 36 is first placed in the vessel 1, and then some of the freezing medium is placed in the bottom of the shell 37, filling it up to about the height of the tubular pedestal 42, whereupon the vessel 30, which has received its contents and has been closed by its lid 34 and gasket 35, is placed down upon this freezing medium and upon the pedestal, after which the packing of the freezing medium is continued in the space 11 outside up to the top of the shell 37, as best seen in Fig. 1. Communicating through the openings 43 in the bottom of the shell, the freezing medium will be packed into one continuous mass around and under the vessel 30. The perforations in the shell 37 will be permeated by the freezing mixture, so that it will come into intimate contact with the cylindrical walls of the inner vessel 30. The perforations in the shell 37 may be as large as a quarter of an inch in diameter, and I preferably use ice broken into particles only slightly larger than this, and preferably use layers of this broken ice alternating with thin layers of salt, in building up the freezing medium, packing the ice and salt very tightly; and by the time the freezing medium has been built up to the required height it will have frozen into a practically continuous mass around the curb 36 and vessel 30, and the freezing of the contents of the vessel will already have commenced.

By the above described means, the inner vessel 30 may be removed readily at any time without disturbing the freezing medium in the least, and may as readily be reinserted to continue the operation. While the inner vessel is removed for the stirring operation, the lid 10 may be replaced to retain the cold air in the vessel, although I have found that this is not necessary, because of the briefness of the interval, and due to the fact that the cold air does not readily rise from the vessel. The high degree of hermetical sealing which my device affords, limits the melting of the ice substantially to that caused by its combination with the salt due to the lower freezing point of the mixture, and practically not any of the melting is due to the influence of the outside atmosphere. Therefore, the consumption of ice in the operation is minimized, and a low temperature is reached early in the operation and maintained as long as it is desired that the freezing operation may continue. The gasket 9 and its core 21 need not be disturbed during the brief removal of the lid. The curb 36 being readily removable from the vessel, and itself being of very open construction, sanitation is thus greatly facilitated.

It is highly desirable that the inner vessel 30 be strictly sanitary; and, preferably, solder is excluded from this construction, as by drawing the vessel into proper shape from a single piece, so that, as here shown, the flat bottom is integral with the cylindrical walls. Such a vessel of one piece and made of aluminum, either drawn or cast, is especially desirable, not only because aluminum resists corrosion but is a good conductor of heat. This inner vessel 30, whatever its construction, should have walls as thin as they may be consistent with proper strength, so that the heat of the contents is very readily delivered to the freezing medium therearound. Glass is the most sanitary material for composing the inner vessel, although it must be somewhat thicker than metal and has inferior heat conductivities. Where glass is to be used, an ordinary glass jar 30ª, with a screw top 34ª, adapted to fit snugly in the shell 37 of the curb 36, may be used, as shown in Fig. 3. When such a jar is used, the frozen ice cream or other substance must be scooped therefrom if the jar has a shoulder as shown, and cannot be slipped out as previously described in connection with the plain cylindrical vessel. By having a plurality of the inner vessels, either of the kind shown in Fig. 1 or of the kind shown in Fig. 3, they may be filled with the substance to be frozen and successively inserted into the device, it thus being possible to provide a continuous supply of the ice cream or other frozen product for some time, with the same freezing medium in the device and without repacking.

When it is desired to remove the freezing medium, the curb 36 may be drawn up out of the vessel, bringing the entire mass of freezing medium with it, which may then be readily removed from around the shell 37 and off of the base 38 of the curb.

From the foregoing it will be seen that, not only are better conditions provided for freezing, but the work is greatly facilitated, so that not only is it not necessary to constantly stir or rotate the contents being frozen, but most of the other manipulation is dispensed with. The capacity of the device may be increased to a reasonable degree by increasing the depth of the parts, although, as before stated, there is a practical limit to the diameter. Also, a plurality of inner vessels may be provided in a single outer vessel, and the curb provided with shells to accommodate the plurality of vessels.

As before stated, the outer heat insulating vessel, with its lid, gasket and clamps, may be used independently of the other parts. It is also to be noted that the entire device is useful in other connections, as for instance it may serve as a lunch or dinner pail; the inner vessel 30 or 30ª serving to hold any liquid which must be kept either hot or cold until used, and the space 11 may receive other articles of food, which will be insulated by the double walls of the vessel 1 and will be kept warm or cool, as the case may be, by the liquid contained in the inner vessel 30 or 30ª.

From the foregoing it will be understood that my invention is capable of some modification, and also of a variety of uses; and therefore I do not wish to be understood as being limited to the precise details and construction and of use as herein set forth, but only as defined by the following claims:

1. In a device of the character described, a vessel, a ledge around inside the rim thereof, a cover for the vessel, a gasket to lie on the ledge between it and the cover, an inner supporting flange for the gasket, detachable from the vessel, cover and gasket, adapted to be removably slid into the top of the vessel with a substantial bearing down along its inner surface, to facilitate the application of the gasket and cover to the vessel, and means to clamp the cover on the vessel.

2. In a device of the character described, in combination with a heat-insulating vessel, a heat insulated lid for said vessel comprising an outer plate having a gutter around in it closely inside of the periphery thereof, an inner plate having a downwardly extended bead around near the periphery thereof and secured to the outer plate at the periphery, and an intermediate plate having a downwardly turned peripheral flange resting inside the downwardly extended bead of the inner plate, held down therein by the lower inside of the gutter part of the outer plate, whereby distinct insulating spaces are formed inside said cover, and means for securing said cover on the vessel by engagement in the outside of the gutter of the outer plate.

3. In a device of the character described, in combination with a heat-insulating vessel, a heat insulated lid for said vessel comprising an outer plate having a gutter around in it closely inside of the periphery thereof, an inner plate having a downwardly extended bead around near the periphery thereof and secured to the outer plate at the periphery, and an intermediate plate having a downwardly turned peripheral flange resting inside the downwardly extended bead of the inner plate, held down therein by the lower inside of the gutter part of the outer plate, whereby distinct insulating spaces are formed inside said cover, means for securing said cover on the vessel by engagement in the outside of the gutter of the outer plate, said vessel having an annular ledge around inside its rim, an annular gasket resting on said ledge, and said cover having its downwardly projected bead of its inner plate resting on said gasket.

4. In a device of the character described, in combination with a heat-insulated vessel, a heat insulated lid for said vessel comprising an outer plate having a gutter around in it closely inside of the periphery thereof, an inner plate having a downwardly extended bead around near the periphery thereof and secured to the outer plate at the periphery, and an intermediate plate having a downwardly turned peripheral flange resting inside the downwardly extended bead of the inner plate, held down therein by the lower inside of the gutter part of the outer plate, whereby distinct insulating spaces are formed inside said cover, means for securing said cover on the vessel by engagement in the outside of the gutter of the outer plate, said vessel having an annular ledge around inside its rim, an annular gasket resting on said ledge, said cover having its downwardly projected bead of its inner plate resting on said gasket, and a short cylindrical flange or collar removably fitting into the upper part of the vessel and engaging said lid around inside its downwardly extended bead to facilitate the application of said gasket and cover to the vessel.

CHARLES P. THOMAS.

Witnesses:
  JAMES N. RAMSEY,
  CLARENCE PERDEW.